United States Patent [19]

Andresen et al.

[11] Patent Number: 4,585,208
[45] Date of Patent: Apr. 29, 1986

[54] VALVE, PARTICULARLY A THERMOSTATIC VALVE FOR HOT WATER RADIATORS

[75] Inventors: Erik E. Andresen, Nordborg; Jorgen Abildtrup, Højbjerg, both of Denmark

[73] Assignee: Danfoss A/S, Nordborg, Denmark

[21] Appl. No.: 567,417

[22] Filed: Dec. 30, 1983

[30] Foreign Application Priority Data

Jan. 11, 1983 [DE] Fed. Rep. of Germany ....... 3300623

[51] Int. Cl.⁴ ............................................. F16K 35/00
[52] U.S. Cl. ..................................... 251/96; 251/205; 137/637.2; 137/637.4
[58] Field of Search ............... 251/118, 120, 121, 125, 251/205, 96; 137/614.19, 637.2, 637.3, 637.4

[56] References Cited

U.S. PATENT DOCUMENTS 3,001,551 9/1961 Wyser ............................ 137/637.4

FOREIGN PATENT DOCUMENTS 2305027 8/1974 Fed. Rep. of Germany ...... 251/120
2503477 8/1976 Fed. Rep. of Germany ... 137/637.4

Primary Examiner—Samuel Scott
Assistant Examiner—Noah Kamen
Attorney, Agent, or Firm—Wayne B. Easton

[57] ABSTRACT

The invention relates to a thermostatic type valve for a hot water radiator. The valve has an adjustable insert for changing the throttle setting of the valve. An intermediate setting element has a spline connection with the insert to facilitate turning of the insert. An adjusting ring likewise has a spline connection with the setting element and also a spline connection with the valve housing which facilitates securing the intermediate setting element to the housing. The adjusting ring is axially moveable relative to the valve housing by reason of the spline connection therewith to permit disengagement therefrom and allow turning of the setting element and the adjustable throttle setting insert to which it is nonrotatably connected by the first referred to spline connection.

5 Claims, 3 Drawing Figures

VALVE, PARTICULARLY A THERMOSTATIC VALVE FOR HOT WATER RADIATORS

BACKGROUND OF THE INVENTION

1. Field of the Invention

The invention relates to a thermostatic valve for hot water radiators.

2. Description of the Prior Art

In a known valve of this kind (DE-PS No. 12 61 722) an insert thereof is provided with a sleeve which surrounds both the closing member and the end thereof which is tapered. Turning the actuating shank produces a throttling cross section of variable size relative to the supply orifice. A split ring retains the insert axially and a setting element is provided having a plurality of axial screws. The circumference of the setting element has faces for engaging a spanner and the middle part thereof carries a seal for the spindle of the closing member. In addition, the setting element is connected to a scale so that, with the aid of the spanner, the insert can be set at a desired throttling position.

SUMMARY OF THE INVENTION

In order to prevent the presetting insert from being turned unintentionally, it must be frictionally held between the split ring and an end face of the housing. The forces that must be applied with the aid of a tool are thus correspondingly large and particular difficulties are encountered if the spindle seal is not securely connected to the setting element. If the spindle seal is only screwed into the setting element it is necessary to work with tools to replace the spindle seal.

It is a main object of the invention to provide a valve, particularly a thermostatic valve, of the aforementioned kind in which the desired setting of the presetting insert is made possible in a much simpler manner and undesired displacement is more effectively avoided then heretofore.

The object is accomplished in accordance with the invention in that the turning tool is an adjusting ring which is axially displaceable relatively to the housing from a rest position to an operative position against the force of a spring. The turning tool has a first coupling zone which makes a coupling engagement with the formations of the setting element in both positions and a second coupling zone which makes a coupling engagement with fixed formations only in the rest position.

In this construction each valve unit housing is equipped with such an adjusting ring and thus a separate turning tool need not be provided. The adjusting ring can be readily operated even in confined positions and small forces are sufficient to turn it if it is in its operative position. This is because the safeguard against turning is not achieved through frictional contact but instead the setting element is locked to the housing by way of the adjusting ring when the latter is in the rest position. Consequently, the presetting adjustment can be made by hand.

It is particularly desirable if the adjusting ring is in the form of a sleeve having an inner flange which has a first spline type connection with the setting element. The inner flange also forms a bearing surface for a spring which has its other end supported by the setting element. The lower end or skirt portion of the sleeve at the side opposite to the spring may have a second spline type of the connection with an intermediate member which turns with the setting element. This allows the adjusting ring to have a relatively small external diameter.

The first and second spline type connections facilitate sufficiently large turning forces to be transmitted so that the setting element may have a relatively small diameter and still allow fine adjustments to be made for the presetting insert.

The adjusting ring should desireably have a smaller diameter than a clamping surface on the housing to which a thermostat attachment is to be clamped or fastened. The adjusting ring in that case will not obstruct the mounting of the thermostat attachment.

The adjusting ring should have a grip enhancing formation at its outer periphery such as recesses or ribbing.

It is desireable for the spindle seal to be screwable into the setting element so that the seal is replaceable without the need for removing other parts. As the setting element to which the seal is threadedly connected is nonrotatably locked to the housing in its rest position, the seal can be turned with an appropriate tool for installation or removal without disturbing the setting element.

In a valve having a retainer member which is secured to the housing and axially retains the setting element, it is desireable for the retainer member to be threadedly connected to the housing and to have a spline type connection with the setting ring to facilitate it being screwed in by means of the setting ring. In this way, the setting ring has a dual function which is its use as the tool for screwing in the retainer member and for setting the throttle opening.

It is also desireable for the presetting insert to be connected to turn with but be axially displaceable with respect to the setting element and to be biased against an end face within the housing by a compression spring supported by the setting element. This makes it possible to use different presetting inserts for preselecting the desired presetting ranges while retaining the remainder of the valve construction.

DESCRIPTION OF THE DRAWINGS

A preferred embodiment of the invention is described hereinafter with reference to the drawing wherein.

Figure 1:
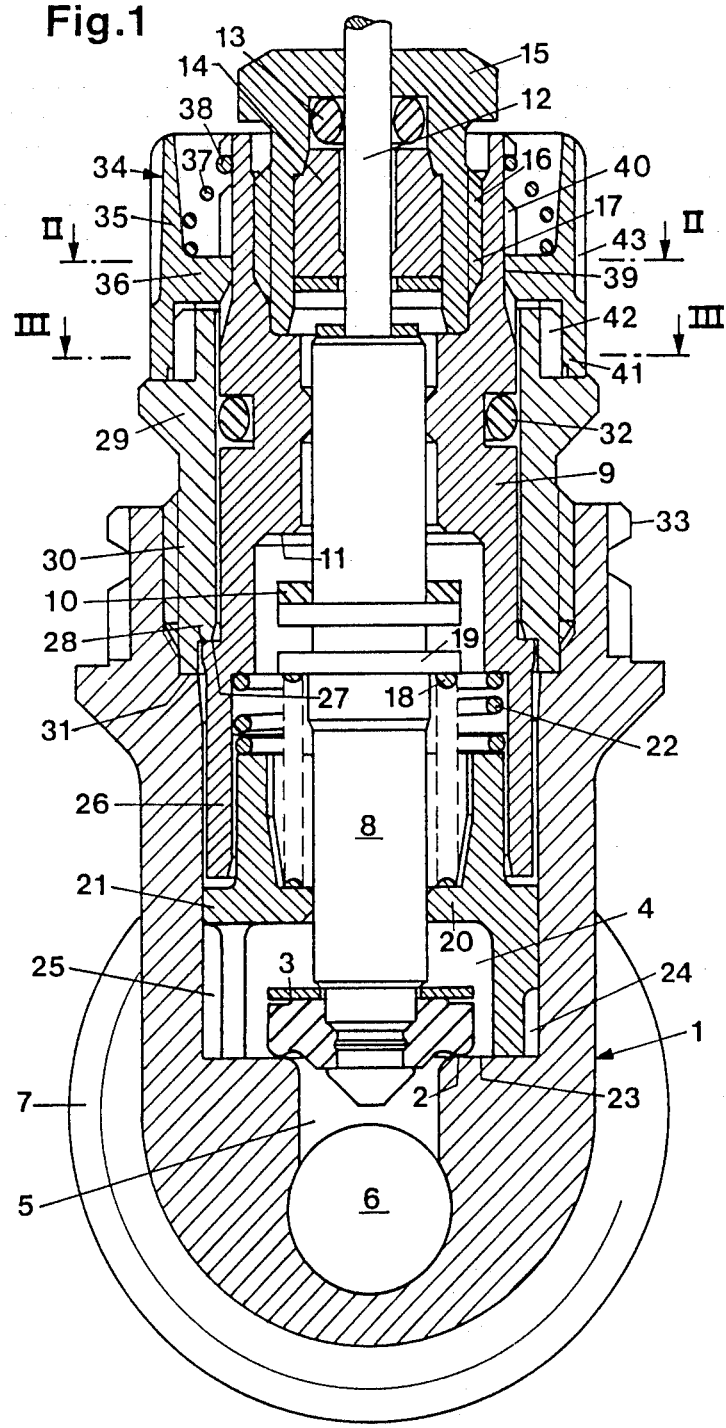
FIG. 1 is a vertical section through a valve unit embodying the invention.
Figure 2:
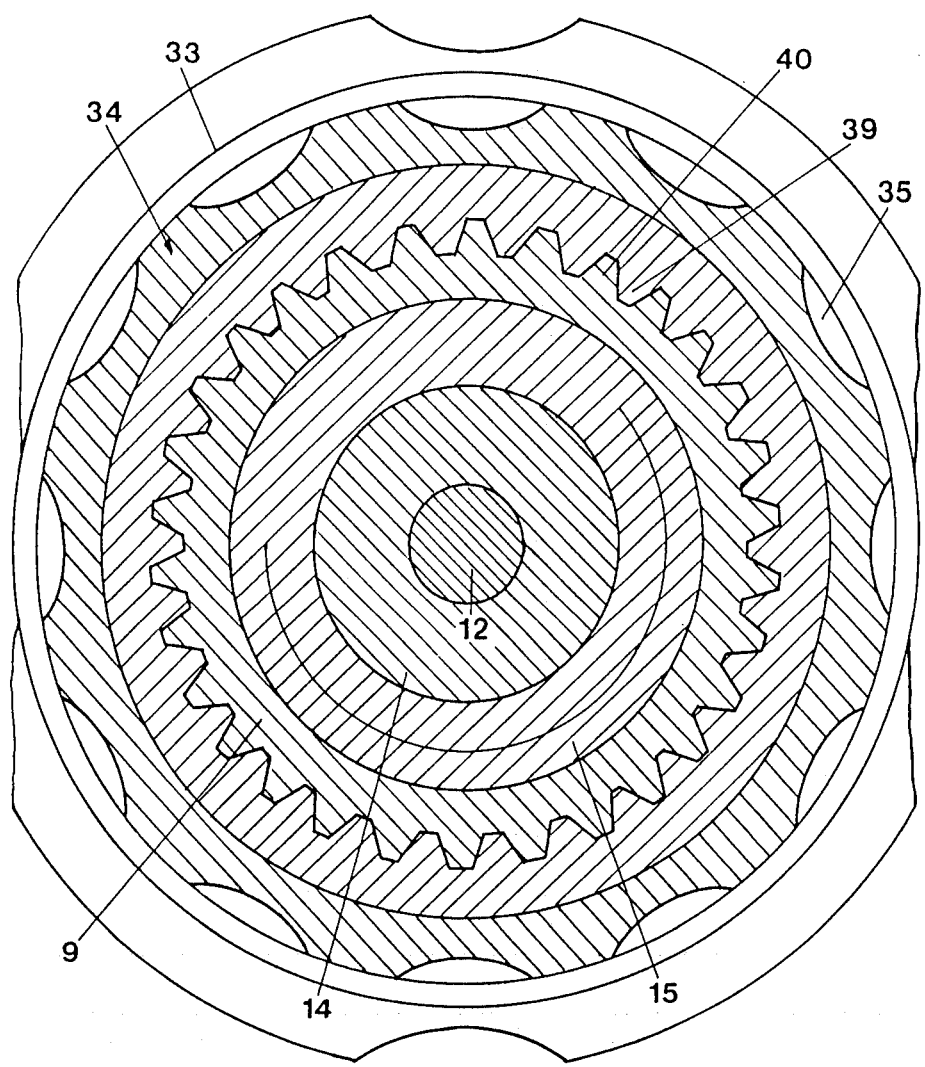
FIG. 2 is a section taken on line II—II of FIG. 1.
Figure 3:
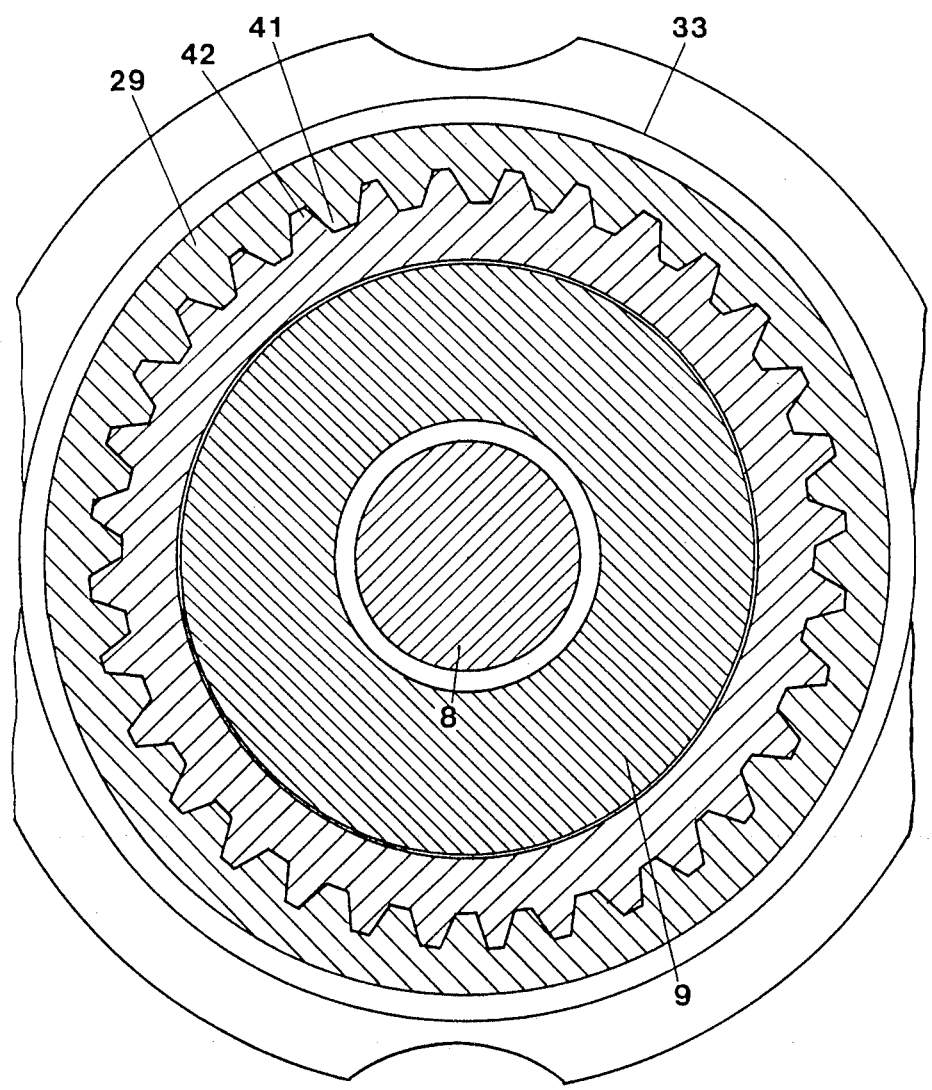
FIG. 3 is a section taken on the line III—III of FIG. 1.

The valve unit comprises a housing 1 having a valve seat 2 and a closure member 3 which is cooperable with the valve seat. Closure member 3 controls the flow between a supply chamber 4 and a discharge chamber 5 which is connected to a connector 7 by a passage 6. Closure member 3 is carried by a valve shank 8 which is guided in a setting element 9. Shank 8 carries a return seal closing member 10 which is cooperable with an annular face 11 on the setting element 9 and shank 8 has positive abutting engagement in the axial direction with a pin shaped spindle 12. A spindle seal 15 provided with a sealing ring 13 and packing 14 has an external screwthread 16 which is engageable with an internal screwthread 17 of the setting element 9. Shank 8 is biased towards spindle 12 by a return spring 18 which is held between a collar 19 on the shank 8 and an internal flange 20 of a presetting insert 21. The latter is pressed against an end face 23 in the housing 1 by a spring 22 which is held between the insert 21 and the setting element 9. Between the insert 21 and housing 1 there is a throttle passage 24 having a cross section which increases continuously in the circumferential direction and the effective section between the mouth 25 thereof as determined by the position of insert 21 controls the effective amount of throttles.

The insert 21 is connected with a spline connection to a coupling 26 to turn with setting element 9 but is axially displaceable with respect thereto. The setting element 9 has a shoulder 27 engaged by counterbore portion 28 of a surrounding depressor member 29. Depressor member 29 has an external screw thread 30 which threadedly engages an internal screw thread of a counterbore in housing 1 and is screwed into the counterbore until it engages an abutment surface 31 thereof. A sealing ring 32 is provided between the setting element 9 and depressor member 29 and clamping face 33 for a thermostat attachment is provided on housing 1 in surrounding relation to the screw thread 30 of depressor member 29.

A setting ring 34 having the form of a sleeve 35 and has an internal flange 36 between the ends thereof forming a depending skirt portion. Pressing on the internal flange 36 is a spring 37 which has the upper end thereof constrained by a shoulder 38 on the setting element 9. Flange 36 has at its inner circumference a first coupling zone 39 in the form of an internal spline in engagement with corresponding external spline 40 internally of the setting element 9. Below the internal flange 36 there is a second coupling zone 41 in the form of internal spline on the skirt portion of the sleeve 35 in engagement with corresponding external spline 42 at the upper end of the depressor member 29. Grooves 43 on the outside of the sleeve 35 enhance gripping of the adjusting ring 34.

The external diameter of sleeve 35 is less than the external diameter of the clamping face so that a thermostat attachment can be pushed over the adjusting ring 34 into engagement with the clamping face 33.

Adjustment of the presetting insert 21 is accomplished by pulling the adjusting ring 34 axially upwardly out of engagement with the depressor member 29, turning the adjusting ring along with the setting element 9 and the insert 21 through a desired angle, and finally releasing the adjusting ring 34 to allow spring 37 to return the adjusting ring 34 to its original position shown in FIG. 1.

For fully automatic assembly shank 8 is preassembled with the insert 21 and introduced in the housing 1. The setting element 9 is pushed over shank 8 followed by installing depressor member 29, adjusting ring 34 and spring 37. A turning tool is used to engage and turn adjusting ring 34 until the depressor member 29 reaches its limiting position. This also secures the axial positions of insert 21 and setting element 9. Thereafter spindle seal 15 is screwed into the upper end of setting element 9, this being facilitated by the complementary screw threads therebetween. The adjustment setting of insert 21 is normally done only when the valve is installed on a radiator.

We claim:

1. A thermostatic valve assembly, comprising, a housing having controlled opening with a surrounding valve seat, said housing defining supply and discharge chambers on opposite sides of said opening, a valve closure member in said supply chamber for controlling the flow of fluid through said opening, an adjustable throttle member rotatably mounted in said valve chamber in surrounding relation to said valve closure member, said throttle member having means so that upon being adjustably rotated it forms an adjustably variable cross section throttle passage, an annularly shaped setting element connected to said throttle member for rotation therewith, an annularly shaped depressor element attached to said housing, first spring means between said depressor element and said throttle element for resiliently biasing said throttle element in an axial direction towards said valve controlled opening, a setting knob connected to said setting element, first spline means between said knob and said setting element and second spline means between said knob and said depressor element, second spring means between said knob and said setting element biasing said knob in an axial direction into abutting engagement with said depressor element, said knob being axially moveable against the force of said second spring via said second spline means to be rotatably disengageable from said depressor element and thereby be free to adjustably rotate said throttle member via said setting element and said first spline means.

2. A valve assembly according to claim 1 wherein said is knob in the form of a sleeve having an inner annularly shaped flange and a skirt portion extending axially relative to said flange, said collar and said setting element having respective engaging and axially extending complementary teeth forming said first spline means, said skirt portion and said housing element having respective engaging and axially extending complementary teeth forming said second spline means, said flange forming abutment means for said second spring.

3. A valve assembly according to claim 1 including a spindle connected to said closure member extending axially through said housing and said depressor element, a spindle seal member, and complementary thread means between said setting element and said spindle seal to effect attachment therebetween.

4. A valve assembly according to claim 1 including complementary thread means between said depressor element and said housing to effect attachment therebetween via said knob.

5. A valve assembly according to claim 1 including third spline means between said setting element and said throttle member to effect turning thereof, a spindle connected to said closure member and having a collar, and return spring means between said collar and said throttle member.

* * * * *